United States Patent
Masui et al.

(10) Patent No.: US 10,471,961 B2
(45) Date of Patent: Nov. 12, 2019

(54) CRUISE CONTROL DEVICE AND CRUISE CONTROL METHOD FOR VEHICLES

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Youhei Masui, Kariya (JP); Toyoharu Katsukura, Kariya (JP); Yoshihisa Ogata, Kariya (JP); Yusuke Matsumoto, Kariya (JP); Takeshi Nanami, Toyota (JP); Takashi Nishida, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 43 days.

(21) Appl. No.: 15/544,855

(22) PCT Filed: Jan. 20, 2016

(86) PCT No.: PCT/JP2016/051573
§ 371 (c)(1),
(2) Date: Jul. 19, 2017

(87) PCT Pub. No.: WO2016/117603
PCT Pub. Date: Jul. 28, 2016

(65) Prior Publication Data
US 2018/0170384 A1 Jun. 21, 2018

(30) Foreign Application Priority Data

Jan. 21, 2015 (JP) ................................. 2015-009772

(51) Int. Cl.
*B60W 30/165* (2012.01)
*B60R 21/00* (2006.01)
(Continued)

(52) U.S. Cl.
CPC ........... *B60W 30/165* (2013.01); *B60R 21/00* (2013.01); *B60W 30/18163* (2013.01);
(Continued)

(58) Field of Classification Search
CPC .. B60W 2420/42; B60W 30/12; B60W 10/20; B60W 2550/30; B60W 30/09;
(Continued)

(56) References Cited

U.S. PATENT DOCUMENTS

| | | | | |
|---|---|---|---|---|
| 2010/0110193 | A1* | 5/2010 | Kobayashi | G06K 9/00798 348/149 |
| 2010/0121569 | A1* | 5/2010 | Nakamura | G01C 21/30 701/532 |

(Continued)

FOREIGN PATENT DOCUMENTS

JP 2007-331608 A 12/2007

*Primary Examiner* — Nicholas Kiswanto
(74) *Attorney, Agent, or Firm* — Knobbe, Martens, Olson & Bear, LLP

(57) ABSTRACT

A cruise control device has a white line recognition unit recognizing a white line defining a lane having the own vehicle, based on an image captured by an image capturing device and a lane entering and leaving determination unit carrying out lane entering determination and lane leaving determination of the own vehicle with respect to a preceding vehicle traveling ahead of the own vehicle based on the relative position of the own vehicle in the vehicle width direction with respect to the white line. In the lane entering determination and lane leaving determination, a preceding vehicle on the lane to which the own vehicle is moving is determined to be an entering lane vehicle whose lane the (Continued)

own vehicle is entering, and a preceding vehicle on the lane from which the own vehicle is moving is determined to be a leaving lane vehicle whose lane the own vehicle is leaving.

6 Claims, 4 Drawing Sheets

(51) Int. Cl.
*G01S 13/86* (2006.01)
*G01S 13/93* (2006.01)
*G08G 1/16* (2006.01)
*B60W 30/18* (2012.01)
*G06K 9/00* (2006.01)
*B60K 31/00* (2006.01)

(52) U.S. Cl.
CPC ............ *G01S 13/86* (2013.01); *G01S 13/867* (2013.01); *G01S 13/93* (2013.01); *G06K 9/00798* (2013.01); *G08G 1/16* (2013.01); *B60K 2031/0025* (2013.01); *B60W 2420/42* (2013.01); *B60W 2550/14* (2013.01); *G01S 2013/9321* (2013.01); *G01S 2013/9353* (2013.01); *G01S 2013/9364* (2013.01)

(58) Field of Classification Search
CPC ............. B60W 50/14; B60W 2420/52; B60W 2550/142; B60W 2550/146; B60W 2550/308; B60W 2550/402; B60W 2710/20; B60W 30/00; B60W 30/14; B60W 30/16; B60W 30/18163; G06T 2207/30256; G06T 2207/30261; G08G 1/167; B62D 15/0255; B62D 6/00; G01C 21/30; G05D 1/0088; G05D 1/0246; H04N 5/247; H04N 7/181; H04N 7/183; B60K 31/00; B60K 31/0008; B60R 11/04; B60R 1/00; B60T 2201/08; B60T 2201/34; B60T 7/12; B60T 7/22; G06K 9/00798; G06K 9/00805; G06K 9/00825
USPC ..... 701/41, 532; 348/46, 148, 149; 382/103, 382/104

See application file for complete search history.

(56) References Cited

U.S. PATENT DOCUMENTS

| | | | | |
|---|---|---|---|---|
| 2010/0246889 A1* | 9/2010 | Nara | .................. | G06K 9/00798 382/104 |
| 2012/0033074 A1* | 2/2012 | Spangenberg | ..... | G06K 9/00798 348/148 |
| 2012/0140039 A1* | 6/2012 | Ota | ........................ | B60W 30/12 348/46 |
| 2014/0152829 A1* | 6/2014 | Suzuki | .................. | G08G 1/167 348/148 |
| 2016/0110616 A1* | 4/2016 | Kawasaki | .......... | G06K 9/00798 382/103 |
| 2016/0121889 A1* | 5/2016 | Shimomura | .......... | B60W 50/14 701/41 |
| 2016/0185388 A1* | 6/2016 | Sim | .................... | B62D 15/0255 701/41 |
| 2016/0229410 A1* | 8/2016 | Clarke | ................. | B60W 30/00 |
| 2016/0283807 A1* | 9/2016 | Ben Shalom | ......... | B60W 30/00 |
| 2017/0082452 A1* | 3/2017 | Sumizawa | ............ | B60W 30/10 |
| 2017/0129489 A1* | 5/2017 | Pawlicki | ............... | B60W 30/18 |
| 2017/0327115 A1* | 11/2017 | Tokimasa | ................ | B60R 21/00 |
| 2017/0327123 A1* | 11/2017 | Tokimasa | ................ | B60R 21/00 |

* cited by examiner

START OF LANE CHANGE · · · END OF LANE CHANGE

CRUISE CONTROL DEVICE AND CRUISE CONTROL METHOD FOR VEHICLES

CROSS-REFERENCE TO RELATED APPLICATION

This application is based on and claims the benefit of priority from earlier Japanese Patent Application No. 2015-009772 filed on Jan. 21, 2015 the descriptions of which is incorporated herein by reference.

TECHNICAL FIELD

The present disclosure concerns a cruise control technique for controlling the behavior of a vehicle equipped with an image capturing device.

BACKGROUND ART

Cruise control systems for vehicles include a following control system that selects as the leading vehicle one of the vehicles traveling ahead of the own vehicle that is on the same lane as the own vehicle, and controls the own vehicle so that it follows the selected leading vehicle. For such following control, accurately selecting a vehicle traveling on the own lane from the vehicles detected by a distance sensor, a vehicle mounted camera, or the like is important. In a conventional technique, the future path the own vehicle is predicted to take is calculated using operations, and a vehicle in the predicted path is set as the target leading vehicle of the following control. For example, PTL 1 discloses a method for selecting the target leading vehicle of the following control as follows. In the technique disclosed in PTL 1, first, a turning circle is calculated based on the yaw rate and the vehicle speed as a prediction of the path which the own vehicle is going to take. Then, in the technique disclosed in PTL 1, the own lane probability, which is the probability of a vehicle ahead of the own vehicle being on the own lane, is calculated based on the lateral offset distance between the course of the own vehicle and the lateral position of the vehicle ahead of the own vehicle. In the technique disclosed in PTL 1, the leading vehicle to be followed is selected according to the calculated own lane probability.

CITATION LIST

Patent Literature

[PTL 1]
JP 2007-331608 A

SUMMARY OF THE INVENTION

Technical Problem

When the own vehicle changes lanes, the yaw rate of the vehicle swings left and right greatly. Thus, with the technique disclosed in PTL 1, the accuracy of the calculated own lane probability of the vehicle ahead of the own vehicle may be inconsistent. In such case, the control of switching a vehicle between selected and unselected as the target leading vehicle of the following control may become unstable (selection hunting may occur).

An object of the present disclosure is to provide a cruise control technique for vehicles that can improve the stability of the selected/unselected state of a leading vehicle.

Solution to Problem

A cruise control device according to the present disclosure adopts the following means.

The present disclosure concerns a cruise control device for a vehicle equipped with an image capturing device configured to capture an image of the view ahead of its own vehicle. A cruise control device according to the present disclosure comprises: a defining line recognition means recognizing a lane defining line defining a lane on which the own vehicle is traveling, based on an image captured by an image capturing device; and a vehicle determination means carrying out lane entering determination and lane leaving determination of the own vehicle with respect to a vehicle traveling ahead of the own vehicle based on the relative position of the own vehicle in the vehicle width direction with respect to a recognized defining line which is the lane defining line recognized by the defining line recognition means, in the lane entering determination and lane leaving determination, the vehicle ahead of the own vehicle on the lane to which the own vehicle is moving is determined to be an entering lane vehicle whose lane the own vehicle is entering, and the vehicle ahead of the own vehicle on the lane from which the own vehicle is moving is determined to be a leaving lane vehicle whose lane the own vehicle is leaving.

Upon lane change from the own lane, the own vehicle crosses the lane defining line and moves in a vehicle width direction (lateral direction). Thus, the relative position of the own vehicle with respect to the lane defining line changes. The lane defining line on the road surface does not move. Thus, the relative position of the own vehicle with respect to the lane defining line will not be affected by its horizontal left and right rotational movements (yaw movements) upon its lane change. Taking note of the above, the cruise control device according to the present disclosure carries out lane entering determination and lane leaving determination of the own vehicle based on the relative position of the own vehicle in the width direction (lateral direction) with respect to the lane defining line. In particular, the cruise control device according to the present disclosure determines a vehicle ahead of the own vehicle traveling on the lane to which the own vehicle is moving to be an entering lane vehicle whose lane the own vehicle is entering. On the other hand, the cruise control device according to the present disclosure determines a vehicle ahead of the own vehicle on the lane from which the own vehicle is moving to be a leaving lane vehicle whose lane the own vehicle is leaving. Thus, the cruise control device according to the present disclosure can accurately carry out lane entering determination and lane leaving determination of the own vehicle with respect to the vehicle ahead of the own vehicle without being affected by its horizontal left and right rotational movements (yaw movements) upon its lane change. As a result, the cruise control device according to the present disclosure can improve the stability of the selected/unselected state of the target leading vehicle of the following control upon lane change of the own vehicle.

DESCRIPTION OF THE EMBODIMENTS

Embodiments of cruise control devices for vehicles will be described below with reference to the drawings. A cruise control device according to this embodiment is mounted on a vehicle and carries out following control which controls the own vehicle so that it follows the leading vehicle, that is, one of the vehicles traveling ahead of the own vehicle that is traveling on the same lane as the own vehicle. The following control according to this embodiment controls the following distance between the own vehicle and the leading vehicle. First, the general configuration of the cruise control device according to this embodiment is described with reference to FIG. 1.

Figure 1:
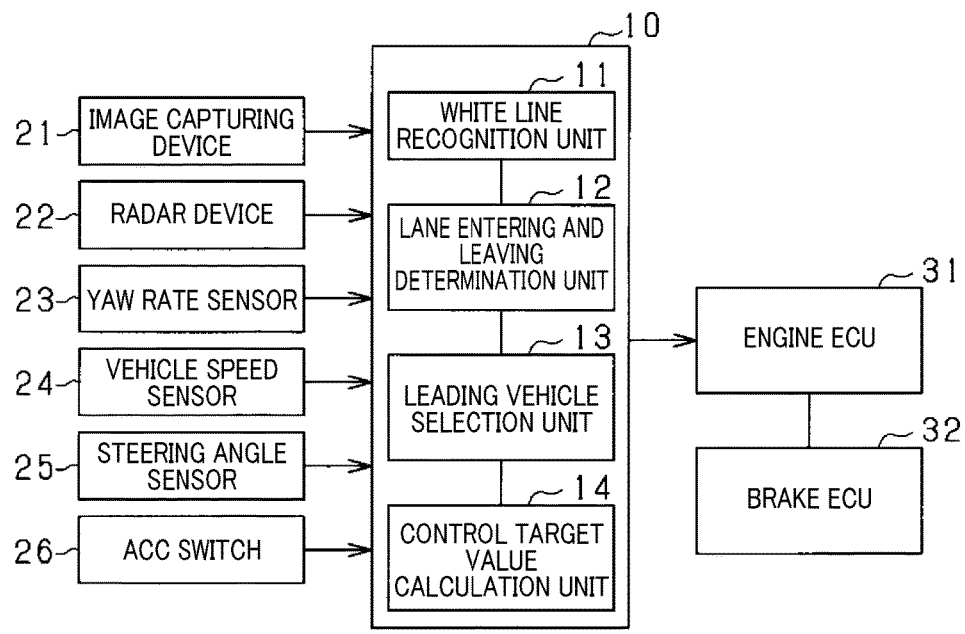
FIG. 1 is a block diagram showing the general configuration of a cruise control device.

Referring to FIG. 1, a cruise control device 10 according to this embodiment is a computer including a CPU, ROM, RAM, I/O, etc., and comprises functional units such as a white line recognition unit 11, a lane entering and leaving determination unit 12, a leading vehicle selection unit 13, and a control target value calculation unit 14. With the CPU executing programs installed in the ROM, the cruise control device 10 realizes these functions. A vehicle on which the cruise control device 10 is mounted (own vehicle) is equipped with an object detection means which detects objects around the vehicle. In this embodiment, the object detection means includes an image capturing device 21 and a radar device 22. The cruise control device 10 receives object detection information from the object detection means, and carries out leading vehicle following control based on the input information.

The image capturing device 21 is a vehicle mounted camera. For example, the image capturing device 21 comprises a CCD camera, a CMOS image sensor, a near-infrared camera, or the like. The image capturing device 21 captures an image of the surrounding environment of the own vehicle (surroundings of the vehicle) including the road on which it is traveling, and generates image data of the captured image. The image capturing device 21 successively outputs generated image data to the cruise control device 10. For example, the image capturing device 21 is attached near the upper edge of the windshield. The image capturing device 21 captures an image of an area ahead of the vehicle within a certain field of view M with the imaging axis passing through its center (the detection area of the image capturing device 21). The image capturing device 21 may be a single lens camera or a stereo camera.

The radar device 22 is a searching device that transmits a transmission signal such as an electromagnetic wave and receives the reflected wave to detect an object. For example, the radar device 22 may comprise a millimeter wave radar. The radar device 22 is attached to the front of the own vehicle. The radar device 22 uses a radar signal to scan an area ahead of the vehicle within a certain field of view $\delta 2$ ($\delta 2 < \delta 1$) with the optical axis passing through its center (the detection area of the radar device 22). The radar device 22 generates distance measurement data of the detected object based on the time from transmission of an electromagnetic wave towards the space ahead of the vehicle to reception of the reflected wave. The radar device 22 successively outputs generated distance measurement data to the cruise control device 10. The distance measurement data includes information on the direction of the object from the own vehicle, the distance from the own vehicle to the object, and the relative velocity of the object with respect to the own vehicle.

The image capturing device 21 and the radar device 22 are attached such that the imaging axis which is the reference axis of the image capturing device 21 and the optical axis which is the reference axis of the radar device 22 are in the same direction as a direction parallel to the surface of the road on which the own vehicle is traveling. The detection area of the image capturing device 21 and the detection area of the radar device 22 at least partially overlap with each other.

The cruise control device 10 receives image data from the image capturing device 21 and distance measurement data from the radar device 22. In addition, the cruise control device 10 receives detection signals from other various sensors mounted on the vehicle. Examples of the other various sensors may include a yaw rate sensor 23, a vehicle speed sensor 24, a steering angle sensor 25, and an ACC switch 26. The yaw rate sensor 23 detects the angular velocity of the vehicle in its turning direction (yaw rate). The vehicle speed sensor 24 detects the speed of the vehicle. The steering angle sensor 25 detects the steering angle of the vehicle. The ACC switch 26 is an input switch for selecting whether the following control mode of the vehicle is carried out.

The cruise control device 10 comprises the white line recognition unit 11, the lane entering and leaving determination unit 12, the leading vehicle selection unit 13, and the control target value calculation unit 14. The white line recognition unit 11 serves as a defining line recognition means recognizing a white line on the road surface as a lane defining line defining the own lane which is the lane on which the own vehicle is traveling. This embodiment recognizes a white line as follows. The white line recognition unit 11 receives image data from the image capturing device 21, and extracts edge points from the received image data as candidates of points forming a white line based on, for example, the rate of luminance change in a horizontal direction of the received image. In addition, the white line recognition unit 11 sequentially stores the extracted edge points in each frame and recognizes (detects) a white line based on the record of stored edge points. The white line recognition unit 11 then stores the recognition result as white line information (information on the recognized defining line).

The lane entering and leaving determination unit 12 serves as a vehicle determination means determining, from the objects detected by the object detection means, the entering lane vehicle whose lane the own vehicle is entering and the leaving lane vehicle whose lane the own vehicle is leaving. That is, the lane entering and leaving determination unit 12 corresponds to a lane entering determination function and a lane leaving determination function of the own vehicle. Objects detected by the object detection means may be hereinafter referred to as "targets" for the sake of convenience. The lane entering and leaving determination unit 12 according to this embodiment merges (combines) data on a target detected by the image capturing device 21 (target included in the image data) and data on a target detected by the radar device 22 (target included in the distance measurement data) that belong to the same object. The lane entering and leaving determination unit 12 determines whether a vehicle ahead of the own vehicle is present by carrying out the determination on the thus obtained target (fusion target), and carries out lane entering determination and lane leaving determination of the own vehicle with respect to the other vehicle. An example of data fusion is to merge image data and distance measurement data by merging a plurality of detection points within a certain fusion range as data belonging to the same object. Further, if a target detected by the image capturing device 21 and a target detected by the radar device 22 have a certain positional relationship, the data sets of the detected targets are assumed to belong to the same object and data fusion is performed. However, the way of data fusion is not limited to this.

The leading vehicle selection unit 13 selects/cancels an object detected by the object detection means as/from the target leading vehicle of the following control based on the result of the lane entering and leaving determination of the own vehicle by the lane entering and leaving determination unit 12. In the cruise control device 10 according to this embodiment, a base map is stored in advance which sets values of the own lane probability, which is the probability of another vehicle ahead of the own vehicle being on the own lane on which the own vehicle is traveling, in association with offset positions, which are relative positions in the vehicle width direction (lateral direction) at which another vehicle ahead of the own vehicle may be located with respect to the own vehicle (hereinafter referred to as "lateral offset positions"). That is, the cruise control device 10 has map data stored in a certain storage area (for example, memory) in which the lateral offset position of another vehicle ahead of the own vehicle is associated with the own lane probability in advance. The leading vehicle selection unit 13 retrieves the value of the own lane probability corresponding to the lateral offset position of another vehicle ahead of the own vehicle from the data of the base map. The leading vehicle selection unit 13 corrects the retrieved own lane probability according to the determination result of the lane entering and leaving determination unit 12. The leading vehicle selection unit 13 then selects a vehicle ahead of the own vehicle with a corrected own lane probability that is equal to or greater than a certain value as the target leading vehicle of the following control. On the other hand, a vehicle ahead of the own vehicle with an own lane probability that is smaller than the certain value is canceled from being selected as the target leading vehicle of the following control. The lateral offset position of a vehicle ahead of the own vehicle is, for example, calculated by correcting the position coordinate in the width direction (lateral direction) detected by the image capturing device 21 based on an estimation R which is the curve radius of the predicted path (curve) of the own vehicle. This embodiment uses the lateral center of the target corresponding to a vehicle ahead of the own vehicle as the lateral offset position of the vehicle ahead of the own vehicle.

The cruise control device 10 according to this embodiment maintains the following distance between the leading vehicle selected by the leading vehicle selection unit 13 and the own vehicle at a preset target distance by controlling the speed of the own vehicle (traveling speed). To this end, the control target value calculation unit 14 calculates a control target value to which the speed of the own vehicle is controlled in order to maintain the target distance. To be specific, the control target value calculation unit 14 calculates control values such as the target engine output and the required braking force, and outputs the calculated control values as control signals to an engine electronic control unit (engine ECU 31). With regard to the control target value calculation unit 14 according to this embodiment, the cruise control device 10 outputs control signals to the engine ECU 31, and the engine ECU 31 outputs a control signal to a brake electronic control unit (brake ECU 32). However, this is not limiting. For example, the cruise control device 10 may output control signals to the engine ECU 31 and the brake ECU 32.

Figure 2:
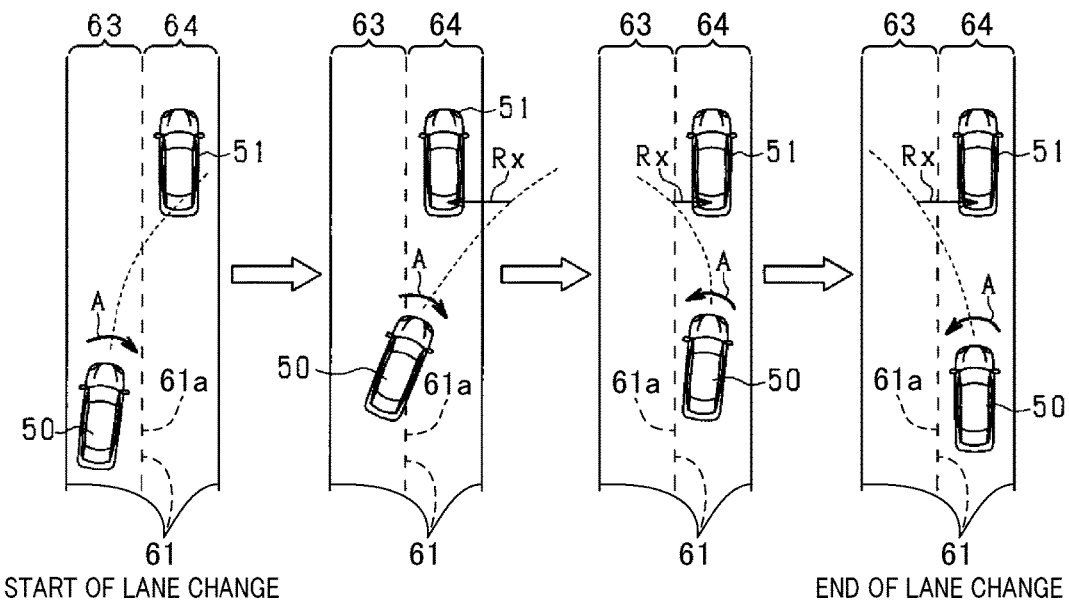
FIG. 2 is a diagram showing the chronological change of when the own vehicle is changing lanes by entering another lane.

Next, lane entering determination and lane leaving determination of the own vehicle according to this embodiment will be described in detail. FIG. 2 shows the process of an own vehicle 50 entering an adjacent lane 64 which is a lane adjacent to an own lane 63 to get behind a vehicle 51 ahead of the own vehicle 50 traveling on the adjacent lane 64 by lane change in the chronological order. The arrow A in FIG. 2 shows the turning direction of the own vehicle 50. As shown in FIG. 2, upon lane change, the yaw rate of the own vehicle 50 swings left and right greatly during the period from the start of lane change to its end. Thus, when the own vehicle 50 is changing lanes, the lateral offset position Rx of the vehicle 51 ahead of the own vehicle 50 with respect to the own vehicle 50 changes with time. If the target leading vehicle of the following control of the own vehicle 50 is identified based on the offset position Rx under such circumstances, the accuracy of the calculated own lane probability of the vehicle 51 ahead of the own vehicle 50 does not stabilize. As a result, the control of switching the leading vehicle between selected and unselected becomes unstable.

Left and right white lines 61 defining the own lane 63 are still and their positions on the road surface do not change. The inventors of the present application took note of the following point. First, lane change of the own vehicle 50 is detected according to the relative position of the own vehicle 50 with respect to a white line 61 in the vehicle width direction (lateral direction) (the lateral position of the own vehicle 50 with respect to the white line 61). The result of the detection is used in the determination of lane entering to get behind the vehicle 51 ahead of the own vehicle 50 and the lane leaving determination. Using this method, the cruise control device 10 according to this embodiment can carry out the determination of lane entering to get behind the vehicle 51 ahead of the own vehicle 50 and the lane leaving determination with reduced effect from the change in the yaw rate of the own vehicle 50 even when the relative positions of the own vehicle 50 and the vehicle 51 ahead of the own vehicle 50 change due to the horizontal left and right rotational movements (yaw movements) upon lane change of the own vehicle 50.

That is, the cruise control device 10 according to this embodiment carries out lane entering determination and lane leaving determination of the own vehicle 50 as follows. The cruise control device 10 determines a vehicle 51 ahead of the own vehicle 50 traveling on the lane to which the own vehicle 50 is moving as the entering lane vehicle whose lane the own vehicle 50 is entering, based on the relative position of the own vehicle 50 in the width direction (lateral direction) with respect to a white line 61 recognized from the image data of the image capturing device 21 (recognized defining line). On the other hand, the cruise control device 10 determines a vehicle 51 ahead of the own vehicle 50 traveling on the lane from which the own vehicle 50 is moving as the leaving lane vehicle whose lane the own vehicle 50 is leaving. In particular, the cruise control device 10 according to this embodiment carries out the following determination process by means of the lane entering and leaving determination unit 12. The lane entering and leaving determination unit 12 calculates an own vehicle white line crossing amount VL indicating how much the own vehicle 50 has crossed (or how close it is to) a white line 61 as a parameter indicating the relative position of the own vehicle 50 in the width direction (lateral direction) with respect to the white line 61 defining the own lane 63. The lane entering and leaving determination unit 12 then performs the lane entering determination and lane leaving determination of the own vehicle 50 based on the calculated own vehicle white line crossing amount VL. "How much the own vehicle 50 has crossed" indicates the amount by which the vehicle has crossed a white line 61, in other words, the amount by which the vehicle has entered another lane crossing a white line 61.

Figure 3:
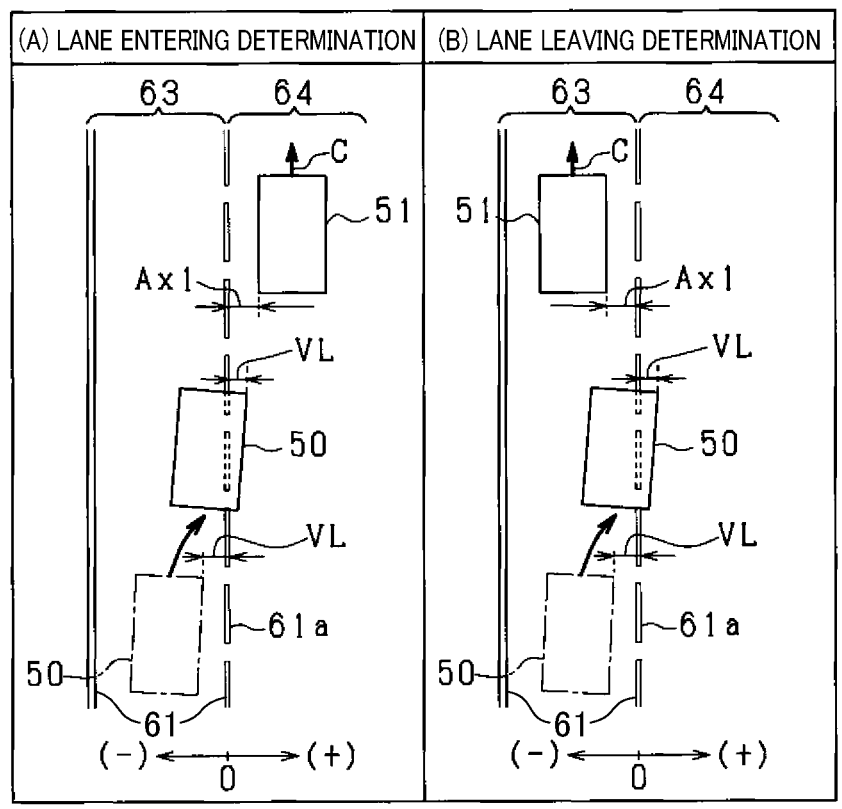
FIG. 3 is a diagram illustrating the lane entering determination and lane leaving determination of the own vehicle.

FIG. 3 is a diagram illustrating the lane entering determination and lane leaving determination of the own vehicle 50 according to this embodiment. FIG. 3 shows a case where a vehicle 51 ahead of the own vehicle 50 is present within the detection distance of the white lines 61 detected by the image capturing device 21 (the recognition distance of the recognized defining lines recognized by the white line recognition unit 11, hereinafter referred to as "white line recognition distance" for the sake of convenience). Further, FIG. 3 shows the chronological change in the location of the own vehicle 50 moving from the position shown with a dot-dash line to the position shown with a solid line. The arrow C in FIG. 3 shows the traveling direction of vehicles including the own vehicle 50 and the vehicle 51 ahead of the own vehicle 50.

For example, it is assumed that the own vehicle 50 changes lanes to get behind the vehicle 51 ahead of the own vehicle 50 traveling on the adjacent lane 64 to the right of the own lane 63. In this case, as shown in column (A) of FIG. 3, the own vehicle 50 gradually approaches the right white line 61a with respect to the traveling direction C of the vehicle, and eventually crosses the white line 61a. Then, the own vehicle 50 gets behind the vehicle 51 ahead of the own vehicle 50 traveling on the adjacent lane 64. Further, for example, it is assumed that the own vehicle 50 behind the vehicle 51 ahead of the own vehicle 50 traveling on the own lane 63 changes lanes to leave to the adjacent lane 64 to the right of the own lane 63. In this case, as shown in column (B) of FIG. 3, the own vehicle 50 gradually approaches the right white line 61a with respect to the traveling direction C of the vehicle, and eventually crosses the white line 61a. Then, the own vehicle 50 moves from behind the vehicle 51 ahead of the own vehicle 50 traveling on the own lane 63 to the adjacent lane 64. In FIG. 3, the own vehicle white line crossing amount VL represents the lateral distance from the right side of the vehicle with respect to the traveling direction C to the white line 61a. Further, in FIG. 3, it is assumed that coordinate positions on the right side (the side of the adjacent lane 64 to which the vehicle is moving) of the reference line, here the white line 61a which the own vehicle 50 crosses upon lane change, with respect to the traveling direction C are positive coordinate positions. Thus, the own vehicle white line crossing amount VL shown in FIG. 3 has a negative value in a state where the own vehicle 50 has got close to the white line 61a by moving to the right with respect to the traveling direction C. In addition, the own vehicle white line crossing amount VL turns zero when the own vehicle 50 crosses the white line 61a, and becomes a positive value once the own vehicle 50 has crossed the white line 61a.

Figure 4:
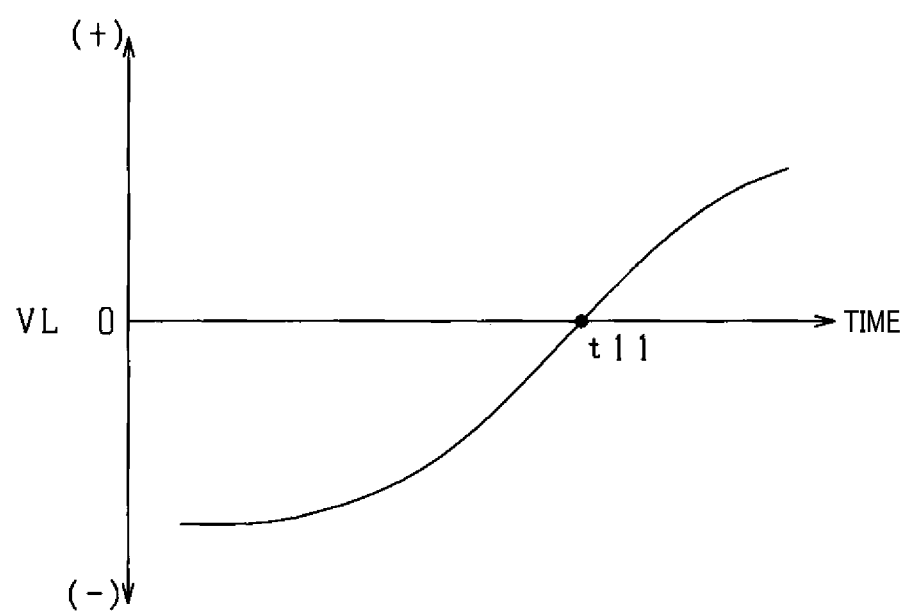
FIG. 4 is a diagram showing the chronological change in the own vehicle white line crossing amount upon lane change of the own vehicle.

FIG. 4 shows the chronological change in the own vehicle white line crossing amount VL upon lane change (lane entering) of the own vehicle 50 corresponding to column (A) of FIG. 3. According to the above definition, as shown in FIG. 4, when the own vehicle 50 changes lanes to enter another lane, the own vehicle white line crossing amount VL turns from a negative value to a positive value at time t11 at which the own vehicle 50 starts to step on the white line 61a. Thus, the lane entering and leaving determination unit 12 compares the own vehicle white line crossing amount VL calculated with respect to the white line 61 recognized from the image data of the image capturing device 21 with a threshold (criterion value) TH1. Then, the lane entering and leaving determination unit 12 carries out lane entering determination of the own vehicle 50 with respect to the vehicle 51 ahead of the own vehicle 50 based on the result of the comparison.

The same applies to the chronological change in the own vehicle white line crossing amount VL upon lane change (lane leaving) of the own vehicle 50 corresponding to column (B) of FIG. 3. When the own vehicle 50 is to leave the own lane 63 to enter the adjacent lane 64 while the vehicle 51 ahead of the own vehicle 50 is traveling on the own lane 63, similarly, the own vehicle white line crossing amount VL represents the lateral distance from the right side of the vehicle with respect to the traveling direction C to the white line 61a. Thus, the lane entering and leaving determination unit 12 compares the own vehicle white line crossing amount VL calculated with respect to the white line 61 recognized from the image data of the image capturing device 21 with a threshold TH1. Then, the lane entering and leaving determination unit 12 carries out lane leaving determination of the own vehicle 50 with respect to the vehicle 51 ahead of the own vehicle 50 based on the result of the comparison. In this embodiment, a certain threshold TH1 is preset as a criterion value for the lane entering determination and lane leaving determination of the own vehicle 50.

In addition, in order to carry out the lane entering determination and lane leaving determination of the own vehicle 50 using the above method, whether the own vehicle 50 entered another vehicle's lane or left another vehicle's lane needs to be determined. Thus, the cruise control device 10 according to this embodiment determines whether the own vehicle 50 is entering a lane to get behind another vehicle or leaving a lane from behind another vehicle based on the relative position of the vehicle 51 ahead of the own vehicle 50 in the width direction (lateral direction) with respect to the white line 61a which the own vehicle 50 is about to cross. To be specific, the cruise control device 10 carries out the following determination process using the lane entering and leaving determination unit 12. The lane entering and leaving determination unit 12 calculates an other vehicle white line crossing amount Ax1 indicating how much the vehicle 51 ahead of the own vehicle 50 has crossed (or how close it is to) a white line 61 as a parameter indicating the relative position of the vehicle 51 ahead of the own vehicle 50 in the width direction (lateral direction) with respect to the white lines 61a which the own vehicle 50 crosses upon lane change. The lane entering and leaving determination unit 12 then determines the vehicle movement (lane entering or lane leaving) of the own vehicle 50 based on the calculated other vehicle white line crossing amount Ax1. As shown in FIG. 3, the other vehicle white line crossing amount Ax1 according to this embodiment represents the lateral distance from one of the left and right sides of the vehicle 51 ahead of the own vehicle 50 that is closer to the white line 61a to the white line 61a. Thus, the lane entering and leaving determination unit 12 determines that the own vehicle 50 has entered a lane to get behind the vehicle 51 ahead of the own vehicle 50 (lane entering of the own vehicle 50) if the other vehicle white line crossing amount Ax1 is a positive value as shown in column (A) of FIG. 3. On the other hand, the lane entering and leaving determination unit 12 determines that the own vehicle 50 has left a lane from behind the vehicle 51 ahead of the own vehicle 50 (lane leaving of the own vehicle 50) if the other vehicle white line crossing amount Ax1 is a negative value as shown in column (B) of FIG. 3.

Meanwhile, for example, when the white lines 61 detected by the image capturing device 21 are only present around the own vehicle 50, and the vehicle 51 ahead of the own vehicle 50 is located beyond the white line recognition distance (located at a far position), the relative position of the vehicle 51 ahead of the own vehicle 50 in the width direction (lateral direction) with respect to a white line 61 cannot be derived from the image data of the image capturing device 21. In such case, for example, a leading vehicle on the own lane 63 may be incorrectly identified, and the identification may take time (identification is delayed).

In view of the above, the cruise control device 10 according to this embodiment carries out the following determination process using the lane entering and leaving determination unit 12. The lane entering and leaving determination unit 12 determines whether the vehicle 51 ahead of the own vehicle 50 is located beyond the white line recognition distance. If the vehicle 51 ahead of the own vehicle 50 is located beyond the white line recognition distance, the lane entering and leaving determination unit 12 calculates a value as follows as a parameter indicating the relative position of the vehicle 51 ahead of the own vehicle 50 in the width direction (lateral direction) with respect to a white line 61 defining the own lane 63. The lane entering and leaving determination unit 12 calculates a distance estimation Ax2 which is the lateral distance from the side of the vehicle 51 ahead of the own vehicle 50 closer to the white line 61a to the white line 61a (hereinafter referred to as "lateral distance estimation"). The lane entering and leaving determination unit 12 then performs the lane entering determination and lane leaving determination of the own vehicle 50 based on the calculated lateral distance estimation Ax2 of the vehicle 51 ahead of the own vehicle 50.

Figure 5:
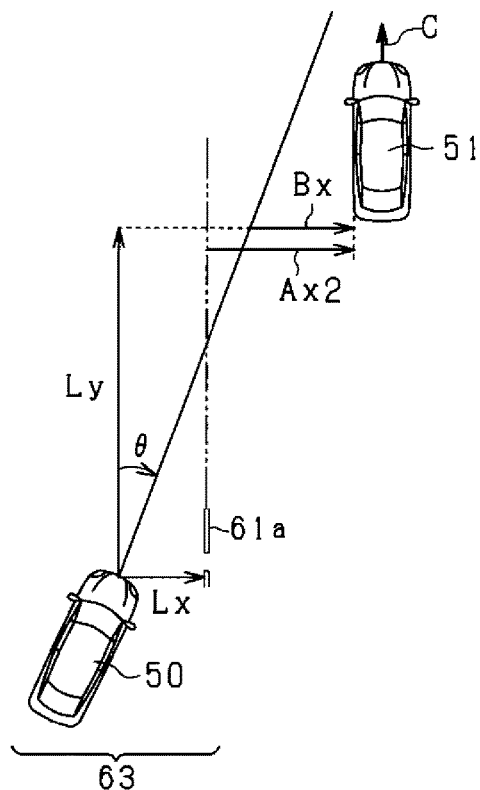
FIG. 5 is a diagram showing a method of calculating the lateral distance estimation of a vehicle ahead of the own vehicle.

FIG. 5 is a diagram showing a method of calculating the lateral distance estimation Ax2 of the vehicle 51 ahead of the own vehicle 50. In FIG. 5, the two-dot chain line shows the part of a white line 61a defining the own lane 63 that cannot be recognized based on the image data of the image capturing device 21. As shown in FIG. 5, the lateral distance estimation Ax2 of the vehicle 51 ahead of the own vehicle 50 according to this embodiment is calculated using Eq. (1) as follows.

$$Ax2=Ly*\tan\theta+Bx-Lx \quad (1)$$

In Eq. (1), Lx represents the distance from the central axis of the own vehicle 50 to the white line 61a which the own vehicle 50 is about to cross. Ly represents the distance from the own vehicle 50 to the vehicle 51 ahead of the own vehicle 50. Bx represents the relative position of the vehicle 51 ahead of the own vehicle 50 in the vehicle width direction (lateral direction) with respect to the own vehicle 50. θ represents the yaw angle with respect to the white line 61a which the own vehicle 50 is about to cross. Thus, if there is a vehicle 51 ahead of the own vehicle 50 located beyond the white line recognition distance, the lane entering and leaving determination unit 12 according to this embodiment calculates the estimated lateral distance Ax2 of the vehicle 51 ahead of the own vehicle 50 with respect to the white line 61a which the own vehicle 50 is about to cross using Eq. (1). The distance Lx is a value detected by the image capturing device 21, and the distance Ly is a value detected by the image capturing device 21 and the radar device 22. The relative position Bx is calculated by subtracting one-half of the vehicle width (vehicle width/2) from the lateral offset position Rx of the vehicle 51 ahead of the own vehicle 50 with respect to the own vehicle 50. The yaw angle θ is the angle between the white line 61a recognized based on the image data of the image capturing device 21 and the central axis of the own vehicle 50.

Figure 6:
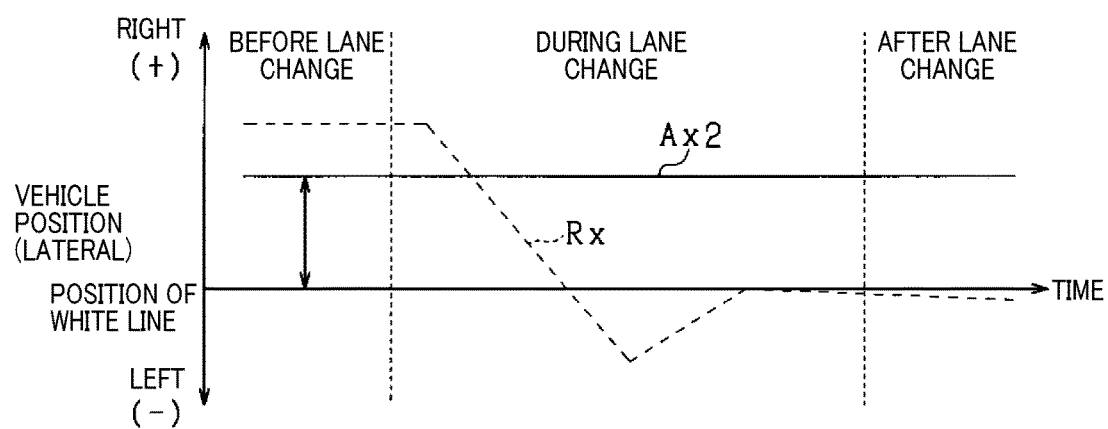
FIG. 6 is a diagram showing the chronological changes in the lateral distance estimation of a vehicle ahead of the own vehicle, and the lateral offset position of the vehicle ahead of the own vehicle upon lane change of the own vehicle.

FIG. 6 is a diagram showing the chronological changes in the lateral distance estimation Ax2 of the vehicle 51 ahead of the own vehicle 50 and the lateral offset position Rx of the vehicle 51 ahead of the own vehicle 50 upon lane change of the own vehicle 50 as shown in FIG. 5. It is to be noted that, FIG. 6 assumes a traveling situation as shown in FIG. 5, and, from the white line 61a which the own vehicle 50 crosses upon lane change, the lateral direction (right in FIG. 5) in which the own vehicle 50 is moving is assumed to be positive, and the opposite direction (left in FIG. 5) is assumed to be negative.

As shown in FIG. 6, the lateral offset position Rx of the vehicle 51 ahead of the own vehicle 50 overshoots upon lane change of the own vehicle 50 (attenuates towards the target value). On the other hand, the lateral distance estimation Ax2 of the vehicle 51 ahead of the own vehicle 50 is stable even during lane change of the own vehicle 50 as long as the vehicle 51 ahead of the own vehicle 50 does not change lanes and keeps traveling on its current lane. For example, according to the change in the lateral distance estimation Ax2 of the vehicle 51 ahead of the own vehicle 50 shown in FIG. 6, it can be understood that the vehicle 51 ahead of the own vehicle 50 is traveling with its lateral distance to the white line 61a which the own vehicle 50 is about to cross kept constant from the start to the end of the lane change of the own vehicle 50.

Next, lane entering determination and lane leaving determination of the own vehicle 50 carried out by the cruise control device 10 according to this embodiment will be described with reference to the flowchart shown in FIG. 7. This process is carried out at a certain cycle by the lane entering and leaving determination unit 12 when the ACC switch 26 is ON (when the following control mode is carried out).

Figure 7:
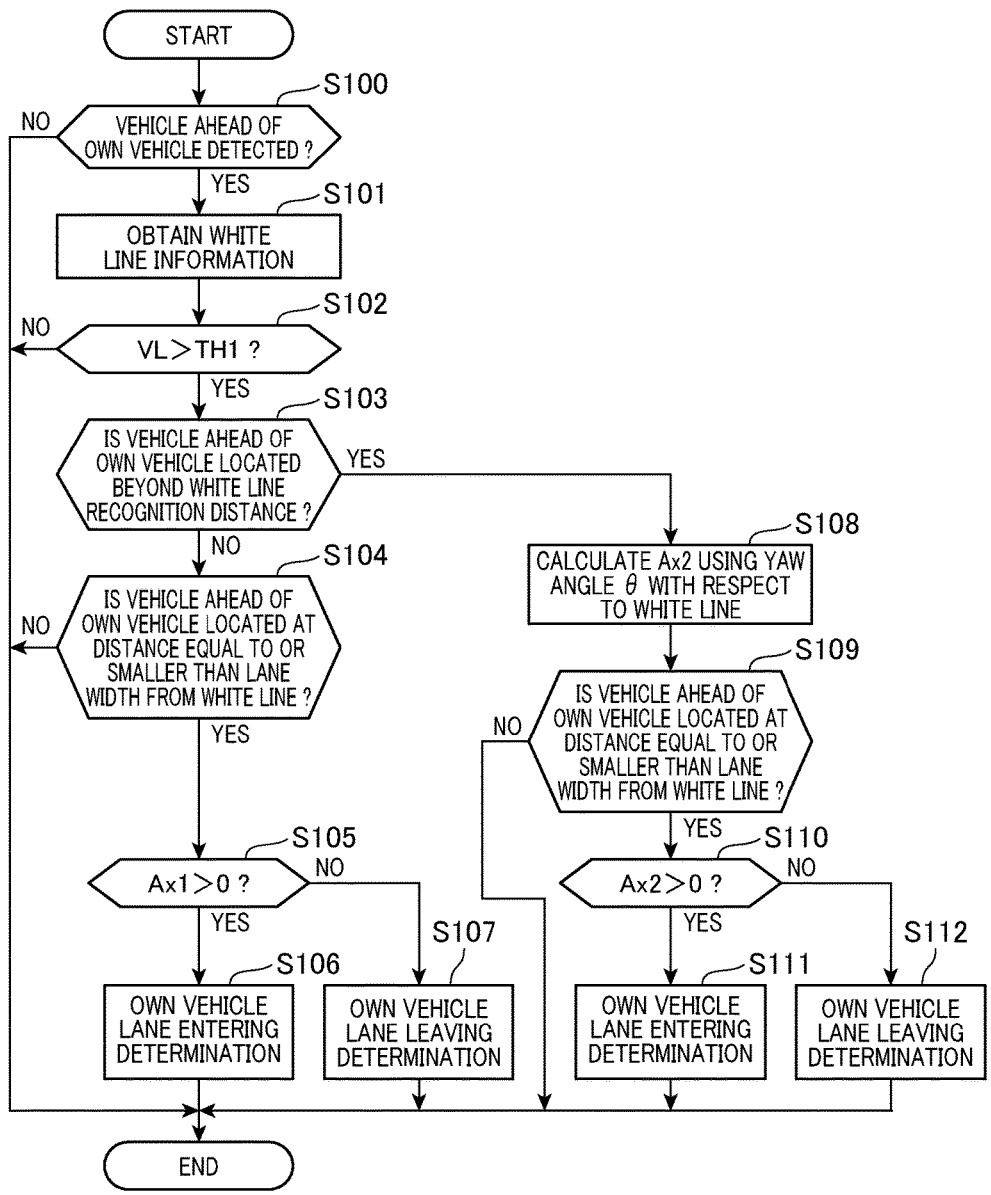
FIG. 7 is a flowchart showing the procedures of the lane entering determination and lane leaving determination of the own vehicle.

As shown in FIG. 7, the lane entering and leaving determination unit 12 determines whether a vehicle 51 ahead of the own vehicle 50 is detected by the object detection means (step S100). In the process at step S100, a fusion target is subjected to the determination of whether a vehicle 51 ahead of the own vehicle 50 is present. In case there are more than one vehicle 51 ahead of the own vehicle 50, one of them may be selected to be subjected to the determination in that cycle. If it is determined that no vehicle 51 ahead of the own vehicle 50 has been detected (there is no vehicle 51 ahead of the own vehicle 50) (step S100: NO), the lane entering and leaving determination unit 12 ends this routine. On the other hand, if it is determined that a vehicle 51 ahead of the own vehicle 50 has been detected (there is a vehicle 51 ahead of the own vehicle 50) (step S100: YES), the lane entering and leaving determination unit 12 proceeds to step S101. Then, the lane entering and leaving determination unit 12 obtains white line information calculated based on the image data of the image capturing device 21 from the white line recognition unit 11 (step S101).

Next, the lane entering and leaving determination unit 12 determines whether the own vehicle white line crossing amount VL is greater than the threshold TH1 (step S102). In this embodiment, a positive threshold TH1 is set so that an affirmative determination is made in the process at step S102 when a state where the own vehicle 50 is crossing the white line 61 is detected. The own vehicle white line crossing amount VL is calculated using Eq. (2) as follows based on the image data of the image capturing device 21.

$$VL = CW/2 - LA \quad (2)$$

In Eq. (2), CW represents the width of the own vehicle 50, and LA represents the distance between the central axis of the own vehicle 50 and the white line 61a. Thus, the lane entering and leaving determination unit 12 according to this embodiment calculates the own vehicle white line crossing amount VL as a parameter indicating the relative position of the own vehicle 50 in the width direction (lateral direction) with respect to the white line 61a which the own vehicle 50 crosses upon lane change. The distance LA is a value calculated by the image capturing device 21.

If it is determined that the own vehicle white line crossing amount VL is equal to or smaller than the threshold TH1 (VL≤TH1) (step S102: NO), the lane entering and leaving determination unit 12 ends this routine. That is, in this embodiment, the routine is ended when the own vehicle 50 has approached the white line 61a and is just about to cross it or when the own vehicle 50 has just crossed the white line 61a. On the other hand, if it is determined that the own vehicle white line crossing amount VL is greater than the threshold TH1 (VL>TH1) (step S102: YES), the lane entering and leaving determination unit 12 proceeds to step S103. Then, the lane entering and leaving determination unit 12 determines whether the vehicle 51 ahead of the own vehicle 50 detected by the object detection means is located beyond the white line recognition distance of the white line 61 detected by the image capturing device 21 (located at a far position) (step S103). In the process at step S103, whether the vehicle 51 ahead of the own vehicle 50 is located beyond the white line recognition distance is determined based on the image data of the image capturing device 21. Thus, in this embodiment, the lane entering and leaving determination unit 12 serves as a distance determination means determining whether the vehicle 51 ahead of the own vehicle 50 is located beyond the white line recognition distance.

If it is determined that the vehicle 51 ahead of the own vehicle 50 is not located beyond the white line recognition distance (step S103: NO), the lane entering and leaving determination unit 12 proceeds to step S104. That is, in this embodiment, the lane entering and leaving determination unit 12 proceeds to step S104 if the vehicle 51 ahead of the own vehicle 50 is located within the white line recognition distance. Then, the lane entering and leaving determination unit 12 determines whether the vehicle 51 ahead of the own vehicle 50 is located at a distance equal to or smaller than a certain vehicle width from the white line 61a which the own vehicle 50 is about to cross (step S104). In the process at step S104, the determination is carried out using the other vehicle white line crossing amount Ax1 calculated based on the image data of the image capturing device 21. In particular, in the process at step S104, for example, if the absolute value of the other vehicle white line crossing amount Ax1 is equal to or smaller than a predetermined vehicle width, it is determined that the vehicle 51 ahead of the own vehicle 50 is located at a distance equal to or smaller than the certain vehicle width from the white line 61a (affirmative determination).

If it is determined that the vehicle 51 ahead of the own vehicle 50 is not located at a distance equal to or smaller than the certain vehicle width from the white line 61a (step S104: NO), the lane entering and leaving determination unit 12 ends this routine. On the other hand, if it is determined that the vehicle 51 ahead of the own vehicle 50 is located at a distance equal to or smaller than the certain vehicle width from the white line 61a (step S104: YES), the lane entering and leaving determination unit 12 proceeds to step S105. Next, the lane entering and leaving determination unit 12 determines whether the other vehicle white line crossing amount Ax1 has a positive value (step S105). If it is determined that the other vehicle white line crossing amount Ax1 has a positive value (Ax1>0) (step S105: YES), the lane entering and leaving determination unit 12 proceeds to step S106. Then, the lane entering and leaving determination unit 12 determines the vehicle 51 ahead of the own vehicle 50 traveling on the lane to which the own vehicle 50 is moving to be an entering lane vehicle whose lane the own vehicle 50 is entering (step S106). On the other hand, if it is determined that the other vehicle white line crossing amount Ax1 has a negative value (Ax1<0) (step S105: NO), the lane entering and leaving determination unit 12 proceeds to step S107. Then, the lane entering and leaving determination unit 12 determines the vehicle 51 ahead of the own vehicle 50 traveling on the lane from which the own vehicle 50 is moving to be a leaving lane vehicle whose lane the own vehicle 50 is leaving (step S107).

In addition, if it is determined that the vehicle 51 ahead of the own vehicle 50 is located beyond the white line recognition distance (step S103: YES), the lane entering and leaving determination unit 12 proceeds to step S108. The lane entering and leaving determination unit 12 calculates the lateral distance estimation Ax2 of the vehicle 51 ahead of the own vehicle 50 based on the yaw angle θ with respect to the white line 61a which the own vehicle 50 is about to cross (step S108). In the process in step S108, the lateral distance estimation Ax2 of the vehicle 51 ahead of the own vehicle 50 is calculated using Eq. 1 described above. Thus, in this embodiment, the lane entering and leaving determination unit 12 serves as a position calculation means calculating the relative position of the vehicle 51 ahead of the own vehicle 50 located beyond the white line recognition distance with respect to the white line 61a in the width direction (lateral direction) based on the yaw angle θ of the own vehicle 50 with respect to the white line 61a. Then, the lane entering and leaving determination unit 12 determines whether the vehicle 51 ahead of the own vehicle 50 is located at a distance equal to or smaller than a certain vehicle width from the white line 61a which the own vehicle 50 is about to cross (step S109). In the process at step S109, the determination is carried out using the lateral distance estimation Ax2 calculated based on the yaw angle θ of the vehicle 51 ahead of the own vehicle 50. In particular, in the process at step S109, for example, if the absolute value of the lateral distance estimation Ax2 of the vehicle 51 ahead of the own vehicle 50 is equal to or smaller than a predetermined vehicle width, it is determined that the vehicle 51 ahead of the own vehicle 50 is located at a distance equal to or smaller than the certain vehicle width from the white line 61a (affirmative determination).

If it is determined that the vehicle 51 ahead of the own vehicle 50 is not located at a distance equal to or smaller than the certain vehicle width from the white line 61a (step S109:

NO), the lane entering and leaving determination unit 12 ends this routine. On the other hand, if it is determined that the vehicle 51 ahead of the own vehicle 50 is located at a distance equal to or smaller than the certain vehicle width from the white line 61*a* (step S109: YES), the lane entering and leaving determination unit 12 proceeds to step S110. Next, the lane entering and leaving determination unit 12 determines whether the lateral distance estimation Ax2 of the vehicle 51 ahead of the own vehicle 50 has a positive value (step S110). If it is determined that the lateral distance estimation Ax2 of the vehicle 51 ahead of the own vehicle 50 has a positive value (Ax2>0) (step S110: YES), the lane entering and leaving determination unit 12 proceeds to step S111. Then, the lane entering and leaving determination unit 12 determines the vehicle 51 ahead of the own vehicle 50 traveling on the lane to which the own vehicle 50 is moving to be an entering lane vehicle whose lane the own vehicle 50 is entering (step S111). On the other hand, if it is determined that the lateral distance estimation Ax2 of the vehicle 51 ahead of the own vehicle 50 has a negative value (Ax2<0) (step S110: NO), the lane entering and leaving determination unit 12 proceeds to step S112. Then, the lane entering and leaving determination unit 12 determines the vehicle 51 ahead of the own vehicle 50 traveling on the lane from which the own vehicle 50 is moving to be a leaving lane vehicle whose lane the own vehicle 50 is leaving (step S112).

As described above in detail, the cruise control device 10 according to this embodiment provides advantageous effects as follows.

The cruise control device 10 according to this embodiment carries out lane entering determination and lane leaving determination of the own vehicle 50 based on the relative position of the own vehicle 50 in the width direction (lateral direction) with respect to a white line 61. In particular, the cruise control device 10 determines a vehicle 51 ahead of the own vehicle 50 traveling on the lane to which the own vehicle 50 is moving to be an entering lane vehicle whose lane the own vehicle 50 is entering. On the other hand, the cruise control device 10 determines a vehicle 51 ahead of the own vehicle 50 on the lane from which the own vehicle 50 is moving to be a leaving lane vehicle whose lane the own vehicle 50 is leaving. Upon lane change of the own vehicle 50, the own vehicle 50 crosses a white line 61 and moves laterally. Thus, the relative position of the own vehicle 50 with respect to the white line 61 changes. The white lines 61 on the road surface defining the own lane 63 do not move. Thus, the relative position of the own vehicle 50 with respect to a white line 61 will not be affected by the horizontal left and right rotational movements (yaw movements) upon lane change of the own vehicle 50. Taking note of these facts, the cruise control device 10 according to this embodiment has been configured as described above. Thus, the cruise control device 10 according to this embodiment can accurately carry out lane entering determination and lane leaving determination of the own vehicle 50 with respect to the vehicle 51 ahead of the own vehicle 50 even upon lane change of the own vehicle 50 without being affected by the change in the yaw rate of the own vehicle 50. As a result, the cruise control device 10 according to this embodiment can improve the stability of the selected/unselected state of the target leading vehicle of the following control upon lane change of the own vehicle 50.

Further, the cruise control device 10 according to this embodiment carries out lane entering determination and lane leaving determination of the own vehicle 50 based on the relative position of the own vehicle 50 in the width direction (lateral direction) with respect to a white line 61. Thus, the cruise control device 10 according to this embodiment can have improved response to switch a vehicle between selected and unselected as the target leading vehicle of the following control.

In particular, the cruise control device 10 according to this embodiment carries out lane entering determination and lane leaving determination of the own vehicle 50 based on the relative position of the own vehicle 50 in the width direction (lateral direction) with respect to a white line 61, and the relative position of the vehicle 51 ahead of the own vehicle 50 in the width direction (lateral direction) with respect to the white line 61. Thus, the cruise control device 10 according to this embodiment can accurately determine on which of the left and right lanes (the lane from which the own vehicle 50 is moving or the lane to which the own vehicle 50 is moving) with respect to the white line 61*a* which the own vehicle 50 is about to cross the vehicle 51 ahead of the own vehicle 50 is located. As a result, the cruise control device 10 according to this embodiment can improve the accuracy of the determination of whether the vehicle 51 ahead of the own vehicle 50 is an entering lane vehicle whose lane the own vehicle 50 is entering or a leaving lane vehicle whose lane the own vehicle 50 is leaving.

In addition, the cruise control device 10 according to this embodiment determines whether the own vehicle 50 entered a lane with respect to the vehicle 51 ahead of the own vehicle 50 or the own vehicle 50 left a lane with respect to the vehicle 51 ahead of the own vehicle 50 when it is detected that the own vehicle 50 crossed the white line 61*a*. Thus, the cruise control device 10 according to this embodiment can prevent a vehicle being selected as or canceled from being the target leading vehicle of the following control in response to vehicle behaviors such as the own vehicle 50 just wavered and approached the white line 61*a*, and does not change lanes (there is no intention to change lanes).

In addition, if it is determined that the vehicle 51 ahead of the own vehicle 50 is located beyond the white line recognition distance of the image capturing device 21 (located at a far position), the cruise control device 10 according to this embodiment carries out lane entering determination and lane leaving determination as follows. The cruise control device 10 calculates the lateral distance estimation Ax2 of the vehicle 51 ahead of the own vehicle 50 with respect to the white line 61 based on the yaw angle $\theta$, that is, the tilt angle of the own vehicle 50 with respect to the white line 61. The cruise control device 10 then performs the lane entering determination and lane leaving determination of the own vehicle 50 based on the calculated lateral distance estimation Ax2 and the own vehicle white line crossing amount VL. That is, the cruise control device 10 according to this embodiment carries out lane entering determination and lane leaving determination of the own vehicle 50 based on the relative position of the vehicle 51 ahead of the own vehicle 50 in the width direction (lateral direction) with respect to a white line 61 (distance estimation Ax2), and the relative position of the own vehicle 50 in the width direction (lateral direction) with respect to the white line 61 (own vehicle white line crossing amount VL). Thus, the cruise control device 10 according to this embodiment can accurately determine on which of the left and right lanes (the lane from which the own vehicle 50 is moving or the lane to which the own vehicle 50 is moving) with respect to the white line 61 the vehicle 51 ahead of the own vehicle 50 is located by means of calculation, even when the relative position of the vehicle 51 ahead of the own vehicle 50 in the width direction (lateral direction) with respect to the white line 61 is not recognized. To be specific, the cruise control device 10 according to this embodiment can accurately determine on which of the left and right lanes (the lane from which the own vehicle 50 is moving or the lane to which the own vehicle 50 is moving) with respect to the white line 61 the vehicle 51 ahead of the own vehicle 50 is located by means of calculation using the yaw angle θ with respect to the white line 61.

In addition, the cruise control device 10 according to this embodiment uses an own vehicle white line crossing amount VL indicating how much the own vehicle 50 has crossed (or how close it is to) a white line 61 as a parameter indicating the relative position of the own vehicle 50 in the width direction (lateral direction) with respect to the white line 61. The cruise control device 10 then performs the lane entering determination and lane leaving determination of the own vehicle 50 based on the own vehicle white line crossing amount VL. Thus, the cruise control device 10 according to this embodiment can accurately and quickly detect that the own vehicle 50 has started changing lanes based on how close the own vehicle 50 is to the white line 61 or how much the own vehicle 50 is overlapping with the white line 61. As a result, the cruise control device 10 according to this embodiment can improve the stability and response of selecting/canceling the target leading vehicle of the following control.

Other Embodiments

A cruise control device 10 according to the present disclosure is not limited to the above-described embodiments. For example, it may be embodied as follows.

The cruise control devices 10 according to the above-described embodiments use the own vehicle white line crossing amount VL as a parameter indicating the relative position of the own vehicle 50 in the width direction (lateral direction) with respect to the white line 61. In addition, the cruise control devices 10 use the other vehicle white line crossing amount Ax1 as a parameter indicating the relative position of the vehicle 51 ahead of the own vehicle 50 in the width direction (lateral direction) with respect to the white line 61, and the lateral distance estimation Ax2 of the vehicle 51 ahead of the own vehicle 50. The cruise control devices 10 perform the lane entering determination and lane leaving determination of the own vehicle 50 based on the own vehicle white line crossing amount VL, the other vehicle white line crossing amount Ax1, and the lateral distance estimation Ax2 of the vehicle 51 ahead of the own vehicle 50. In contrast, in another embodiment, the relative position of the vehicle 51 ahead of the own vehicle 50 in the width direction (lateral direction) with respect to the white line 61 (other vehicle white line crossing amount Ax1) is not used. In another embodiment, the lane entering determination and lane leaving determination of the own vehicle 50 may be carried out based on only the relative position of the own vehicle 50 in the width direction (lateral direction) with respect to the white line 61 (own vehicle white line crossing amount VL). To be specific, if the object detection means detects a vehicle 51 ahead of the own vehicle 50 traveling on an own lane 63 which is the lane on which the own vehicle 50 is traveling, and the own vehicle white line crossing amount VL is greater than the threshold TH1, the vehicle 51 ahead of the own vehicle 50 traveling on the own lane 63 is determined to be a leaving lane vehicle. In addition, if the object detection means detects a vehicle 51 ahead of the own vehicle 50 traveling on an adjacent lane 64 adjacent to the own lane 63, and the own vehicle white line crossing amount VL is greater than the threshold TH1, the vehicle 51 ahead of the own vehicle 50 traveling on the adjacent lane 64 is determined to be an entering lane vehicle.

Although the cruise control devices 10 according to the above-described embodiments calculate the own vehicle white line crossing amount VL indicating how much the own vehicle 50 has crossed a white line 61 as a parameter indicating the relative position of the own vehicle 50 in the width direction (lateral direction) with respect to the white line 61, this is not limiting. The parameter indicating the relative position of the own vehicle 50 in the width direction (lateral direction) with respect to the white line 61 is not limited to the own vehicle white line crossing amount VL. In another embodiment, for example, the position coordinate of the own vehicle 50 in the width direction (lateral direction) with respect to the white line 61 may be calculated, and the lane entering determination and lane leaving determination of the own vehicle 50 may be carried out based on the calculated position coordinate.

In the cruise control devices 10 according to the above-described embodiments, the own vehicle white line crossing amount VL is the lateral distance from a side of the own vehicle 50 to the white line 61$a$ which the own vehicle 50 is about to cross. However, this is not limiting. How much the own vehicle 50 has crossed (or how close the own vehicle 50 is to) the white line 61$a$ may be expressed differently. In another embodiment, for example, the own vehicle white line crossing amount VL may be the ratio of the distance XL from a side of the own vehicle 50 to the white line 61$a$ to the lane width WL of the lane on which the own vehicle 50 is traveling (own lane 63) (XL/WL). In addition, in another embodiment, the own vehicle white line crossing amount VL may be the distance from the central axis of the own vehicle 50 to the white line 61$a$. Alternatively, in another embodiment, the own vehicle white line crossing amount VL may be the lateral length of the part of the own vehicle 50 that has not crossed the white line 61$a$ (vehicle width minus the own vehicle white line crossing amount VL).

In the cruise control devices 10 according to the above-described embodiments, the lateral distance from a side of the vehicle 51 ahead of the own vehicle 50 to the white line 61 (the other vehicle white line crossing amount Ax1 and the distance estimation Ax2) is used as a parameter indicating the relative position of the vehicle 51 ahead of the own vehicle 50 in the width direction (lateral direction) with respect to the white line 61. However, this is not limiting. In another embodiment, for example, the distance from the central axis of the vehicle 51 ahead of the own vehicle 50 to the white line 61 may be used as the parameter. Alternatively, in another embodiment, the ratio of the crossing amount Ax of the vehicle 51 ahead of the own vehicle 50 into the own lane 63 to the lane width WL of the traveling lane (=Ax/WL) may be used as the parameter.

In the cruise control devices 10 according to the above-described embodiments, the own vehicle white line crossing amount VL, the other vehicle white line crossing amount Ax1, and the lateral distance estimation Ax2 of the vehicle 51 ahead of the own vehicle 50 are calculated with respect to the white line 61$a$ which the own vehicle 50 is about to cross. However, this is not limiting. In another embodiment, the other one of the left and right white lines 61 defining the own lane 63 that is not the white line 61$a$ the own vehicle 50 is about to cross may be used as the reference line. To be specific, for example, when the white line 61$a$ is the right white line 61 of the left and right white lines 61 defining the own lane 63, the left white line 61 different from the white line 61a may be used as the reference line. In such embodiment, the own vehicle white line crossing amount VL, the other vehicle white line crossing amount Ax1, and the lateral distance estimation Ax2 of the vehicle 51 ahead of the own vehicle 50 with respect to the left white line 61 may be obtained.

In the cruise control devices 10 according to the above-described embodiments, the same threshold TH1 is used for both of the lane entering determination and lane leaving determination of the own vehicle 50 based on the own vehicle white line crossing amount VL. However, this is not limiting. In another embodiment, different thresholds may be used in the lane entering determination and lane leaving determination.

In the cruise control devices 10 according to the above-described embodiments, a threshold TH1 is set to detect (determine) a state where the own vehicle 50 has crossed the white line 61a by a certain amount or more. However, this is not limiting. In another embodiment, a threshold TH1 may be set to also detect (determine) a state where the own vehicle 50 is approaching the white line 61a, that is, a state where the own vehicle 50 is not crossing the white line 61a yet.

In the cruise control devices 10 according to the above-described embodiments, the white line 61a which the own vehicle 50 is about to cross is used as the reference line. The cruise control device 10 defines the positive and negative of the relative position of the own vehicle 50 in the width direction (lateral direction) with respect to the white line 61a by defining the area in a lateral direction in which the own vehicle 50 is moving with respect to the reference line as the positive area, and the opposite area as the negative area. However, the positive and negative of the relative position of the own vehicle 50 in the width direction (lateral direction) with respect to the white line 61a is not limited to this. In another embodiment, for example, the right side with respect to the traveling direction C is defined as the positive area, and the left side is defined as the negative area. Alternatively, it is also possible that the left side with respect to the traveling direction C is defined as the positive area, and the right side is defined as the negative area.

In another embodiment, the lane entering determination and lane leaving determination of the own vehicle 50 using the relative position of the own vehicle 50 in the width direction (lateral direction) with respect to the white line 61 may not be carried out when the vehicle 51 ahead of the own vehicle 50 is located beyond the white line recognition distance. To be specific, if the determination result of the process at step S103 shown in FIG. 7 is affirmative, the processes at steps S108-S112 are not carried out and the routine ends. In this case, for example, the lane entering determination and lane leaving determination of the own vehicle 50 with respect to the vehicle 51 ahead of the own vehicle 50 may be carried out using the offset position Rx which is the relative position of the vehicle 51 ahead of the own vehicle 50 in the width direction (lateral direction) with respect to the own vehicle 50.

In the cruise control devices 10 according to the above-described embodiments, fusion targets are subjected to the lane entering determination and lane leaving determination of the own vehicle 50. However, this is not limiting. In another embodiment, targets included in the image data of the image capturing device 21 or targets detected by the radar device 22 may be subjected to the lane entering determination and lane leaving determination of the own vehicle 50.

In the cruise control devices 10 according to the above-described embodiments, the object detection means comprises an image capturing device 21 and a radar device 22. However, this is not limiting. In another embodiment, for example, instead of the radar device 22, it may comprise a sonar device configured to detect objects by transmitting ultrasonic waves. In addition, the technique of the present disclosure may be applied to a system comprising only the image capturing device 21 as the object detection means.

REFERENCE SIGNS LIST

10 . . . Cruise control device; 11 . . . White line recognition unit; 12 . . . Lane entering and leaving determination unit; 13 . . . Leading vehicle selection unit; 14 . . . Control target value calculation unit; 21 . . . Image capturing device; 22 . . . Radar device; 23 . . . Yaw rate sensor; 31 . . . Engine ECU; 32 . . . Brake ECU.

The invention claimed is:

1. A cruise control device for providing a following control of a target leading vehicle by a following vehicle, the following vehicle equipped with an image capturing device configured to capture an image of the view ahead of the following vehicle, the cruise control device comprising:
   at least one electronic control unit including a processor and non-transitory computer-readable memory, the at least one electronic control unit configured to:
   recognize a lane defining line defining a lane on which the following vehicle is traveling, based on the image captured by the image capturing device;
   select/cancel a vehicle traveling ahead of the following vehicle as/from being the target leading vehicle for providing the following control based on the relative position of the following vehicle in the vehicle width direction with respect to a recognized defining line which is the lane defining line
      a vehicle ahead of the following vehicle within the lane to which the following vehicle is moving being selected as the target leading vehicle, and
      a vehicle ahead of the following vehicle within the lane from which the own vehicle is moving being canceled from being the target leading vehicle; and
   output a control signal to control a vehicle speed of the following vehicle to keep a distance between the following vehicle and the target leading vehicle.

2. The cruise control device according to claim 1, the at least one electronic control unit further configured to:
   carry out the lane entering determination and lane leaving determination of the own vehicle based on the relative position of the own vehicle in the vehicle width direction with respect to the recognized defining line, and the relative position of the vehicle ahead of the own vehicle in the vehicle width direction with respect to the recognized defining line.

3. The cruise control device according to claim 2, the at least one electronic control unit further configured to:
   determine whether the vehicle ahead of the own vehicle is located beyond the recognition distance of the lane defining line recognized,
   calculate the relative position of the vehicle ahead of the own vehicle located beyond the recognition distance in the vehicle width direction with respect to the recognized defining line based on the tilt angle of the own vehicle with respect to the recognized defining line, and carrying out the lane entering determination and lane leaving determination of the own vehicle, in response to the vehicle ahead of the own vehicle is determined to be located beyond the recognition distance, based on the relative position of the own vehicle in the vehicle width direction with respect to the recognized defining line, and the relative position of the vehicle ahead of the own vehicle in the vehicle width direction calculated.

4. The cruise control device according to claim 1, the at least one electronic control unit further configured to:
   calculate how close the own vehicle is to or how much the own vehicle has crossed the recognized defining line as a parameter indicating the relative position of the own vehicle in the vehicle width direction with respect to the recognized defining line, and carry out the lane entering determination and lane leaving determination of the own vehicle based on the calculated closeness or degree of crossing.

5. A cruise control method for providing a following control of a target leading vehicle by a following vehicle, the following vehicle equipped with an image capturing device configured to capture an image of the view ahead of the following vehicle, the cruise control method comprising:
   recognizing a lane defining line defining a lane on which the following vehicle is traveling based on the image captured by the image capturing device;
   selecting/canceling a vehicle traveling ahead of the following vehicle as/from being the target leading vehicle for providing the following control based on the relative position of the following vehicle in the vehicle width direction with respect to a recognized defining line which is the lane defining line,
      a vehicle ahead of the following vehicle on the lane to which the following vehicle is moving being selected as the target leading vehicle, and
      a vehicle ahead of the following vehicle within the lane from which the own vehicle is moving being canceled from being the target leading vehicle; and
   outputting a control signal to control a vehicle speed of the following vehicle to keep a distance between the following vehicle and the target leading vehicle.

6. A cruise control device for providing a following control of a target leading vehicle by a following vehicle, the following vehicle equipped with an image capturing device configured to capture an image of the view ahead of the following vehicle, the cruise control device comprising:
   a non-transitory computer-readable memory;
   a processor communicable to the non-transitory computer-readable memory; and
   a set of computer-executable instructions stored on the non-transitory computer-readable memory that cause the processor to implement:
      recognizing a lane defining line defining a lane on which the following vehicle is traveling, based on the image captured by the image capturing device;
      selecting/canceling a vehicle traveling ahead of the following vehicle as/from being the target leading vehicle for providing the following control based on the relative position of the following vehicle in the vehicle width direction with respect to a recognized defining line which is the lane defining line,
         a vehicle ahead of the following vehicle within the lane to which the following vehicle moving being selected as the target leading vehicle, and
         a vehicle ahead of the following vehicle within the lane from which the own vehicle is moving being canceled from being the target leading vehicle; and
      outputting a control signal to control a vehicle speed of the following vehicle to keep a distance between the following vehicle and the target leading vehicle.

* * * * *